US012620725B2

(12) United States Patent
Sundararajan et al.

(10) Patent No.: US 12,620,725 B2
(45) **Date of Patent: *May 5, 2026**

(54) LOW COST HIGH PERFORMANCE MULTIBAND CELLULAR ANTENNA WITH CLOAKED MONOLITHIC METAL DIPOLE

(71) Applicant: JOHN MEZZALINGUA ASSOCIATES, LLC, Liverpool, NY (US)

(72) Inventors: Niranjan Sundararajan, Liverpool, NY (US); Charles Buondelmonte, Baldwinsville, NY (US); Andrew Litteer, Clay, NY (US); Wengang Chen, Liverpool, NY (US)

(73) Assignee: JOHN MEZZALINGUA ASSOCIATES, LLC, Liverpool, NY (US)

( * ) Notice: Subject to any disclaimer, the term of this patent is extended or adjusted under 35 U.S.C. 154(b) by 21 days.

This patent is subject to a terminal disclaimer.

(21) Appl. No.: 18/541,805

(22) Filed: Dec. 15, 2023

(65) Prior Publication Data

US 2024/0266758 A1 Aug. 8, 2024

Related U.S. Application Data

(63) Continuation of application No. 17/494,329, filed on Oct. 5, 2021, now Pat. No. 11,855,359, which is a (Continued)

(51) Int. Cl.

*H01Q 21/26* (2006.01)
*H01Q 1/52* (2006.01)

(Continued)

(52) U.S. Cl.

CPC ............ *H01Q 21/26* (2013.01); *H01Q 1/523* (2013.01); *H01Q 9/285* (2013.01); *H01Q 1/246* (2013.01);

(Continued)

(58) Field of Classification Search

CPC .......... H01Q 1/246; H01Q 1/52; H01Q 1/521; H01Q 1/523; H01Q 1/525; H01Q 5/40;

(Continued)

(56) References Cited

U.S. PATENT DOCUMENTS 9,570,804 B2 2/2017 Shang et al.
9,819,084 B2 11/2017 Zimmerman et al.

(Continued)

FOREIGN PATENT DOCUMENTS

CN 102804492 A 11/2012
CN 105846113 A 8/2016

(Continued)

OTHER PUBLICATIONS

Butler, R. et al. "Broadband multiband phased array antennas for cellular communications", 2016, ISAP, IEICE, pp. 160-161.

(Continued)

*Primary Examiner* — Robert Karacsony
(74) *Attorney, Agent, or Firm* — Meunier Carlin & Curfman LLC

(57) ABSTRACT

Disclosed is a high performance low cost multiband antenna configuration that has a low band dipole having dipole arms formed of stamped sheet metal with a plurality of inductor structures. The plurality of inductor structures are oriented along a longitudinal axis of the low band dipole arm, and others are oriented orthogonal to the longitudinal axis. The plurality of the inductor structures act as cloaking structures that make the low band dipole substantially transparent to high band RF energy without inhibiting the performance of the dipole in the low band.

8 Claims, 14 Drawing Sheets

Related U.S. Application Data continuation of application No. 16/758,094, filed as application No. PCT/US2018/057453 on Oct. 25, 2018, now Pat. No. 11,145,994.

(60) Provisional application No. 62/577,407, filed on Oct. 26, 2017.

(51) Int. Cl.

| | |
|---|---|
| ***H01Q 9/28*** | (2006.01) |
| *H01Q 1/24* | (2006.01) |
| *H01Q 5/42* | (2015.01) |
| *H01Q 5/48* | (2015.01) |
| *H01Q 19/10* | (2006.01) |
| *H01Q 21/06* | (2006.01) |
| *H01Q 21/28* | (2006.01) |

(52) U.S. Cl.

CPC ................ *H01Q 5/42* (2015.01); *H01Q 5/48* (2015.01); *H01Q 19/108* (2013.01); *H01Q 21/062* (2013.01); *H01Q 21/28* (2013.01)

(58) Field of Classification Search

CPC .. H01Q 5/42; H01Q 5/48; H01Q 9/16; H01Q 9/28; H01Q 9/285; H01Q 19/10; H01Q 19/108; H01Q 21/062; H01Q 21/08; H01Q 21/24; H01Q 21/26; H01Q 21/28

See application file for complete search history.

(56) References Cited

U.S. PATENT DOCUMENTS

| | | | | |
|---|---|---|---|---|
| 9,912,076 | B2 | 3/2018 | Bisiules | |
| 9,960,474 | B2 | 5/2018 | Katipally et al. | |
| 10,224,639 | B2 | 3/2019 | Chainon et al. | |
| 10,439,285 | B2 | 10/2019 | Isik et al. | |
| 10,601,120 | B2 | 3/2020 | Bisiules et al. | |
| 10,644,401 | B2 | 5/2020 | Shang et al. | |
| 11,145,994 | B2 * | 10/2021 | Sundararajan | H01Q 19/10 |
| 11,855,359 | B2 * | 12/2023 | Sundararajan | H01Q 1/246 |
| 2012/0133567 | A1 | 5/2012 | Harel et al. | |
| 2012/0280878 | A1 | 11/2012 | Timofeev | |
| 2014/0125539 | A1 | 5/2014 | Katipally et al. | |
| 2015/0138032 | A1 | 5/2015 | Yona et al. | |
| 2015/0280324 | A1 | 10/2015 | Petropoulos | |
| 2015/0295313 | A1 | 10/2015 | Zimmerman et al. | |
| 2016/0294065 | A1 | 10/2016 | Lindmark | |
| 2016/0329642 | A1 | 11/2016 | Chainon et al. | |
| 2016/0365645 | A1 | 12/2016 | Bisiules | |
| 2018/0026379 | A1 | 1/2018 | Barker et al. | |
| 2020/0067205 | A1 | 2/2020 | Segador Alvarez et al. | |
| 2020/0127389 | A1 | 4/2020 | Li et al. | |
| 2020/0161748 | A1 * | 5/2020 | Isik | H01Q 5/42 |
| 2020/0212598 | A1 | 7/2020 | Gonzalez et al. | |
| 2020/0243972 | A1 * | 7/2020 | Tang | H01Q 21/26 |
| 2020/0373668 | A1 | 11/2020 | Wu et al. | |

FOREIGN PATENT DOCUMENTS

| | | | |
|---|---|---|---|
| CN | 106104914 | A | 11/2016 |
| CN | 106233532 | A | 12/2016 |
| KR | 20120086841 | A | 8/2012 |
| KR | 101703741 | B1 | 2/2017 |
| WO | 2016/081036 | | 5/2016 |
| WO | 2016081036 | A1 | 5/2016 |
| WO | 2017/097164 | | 6/2017 |
| WO | 2017097164 | A1 | 6/2017 |
| WO | 2019084232 | A1 | 5/2019 |
| WO | 2021222217 | A1 | 11/2021 |

OTHER PUBLICATIONS

Extended European Supplementary Search Report dated Jul. 7, 2021, from related EP application No. 18870784.8, 13 pages.

Office Action and Search Report, dated Sep. 2, 2022, received in connection with corresponding CN Patent Application No. 201880069507.9 (and English translation).

Office Action, dated Feb. 16, 2023, received in connection with corresponding EP Patent Application No. 18 870 784.8.

International Search Report and Written Opinion dated Feb. 11, 2019, from International Application No. PCT/US2018/057453, 14 pages.

Office Action, dated Feb. 4, 2025, received in connection with corresponding EP Patent Application No. 18870784.8.

Office Action in connection to CA Application No. 3,077,431, dated Dec. 13, 2024.

* cited by examiner

LOW COST HIGH PERFORMANCE MULTIBAND CELLULAR ANTENNA WITH CLOAKED MONOLITHIC METAL DIPOLE

This application is a Continuation of application Ser. No. 17/494,329, filed Oct. 5, 2021, which is a Continuation of application Ser. No. 16/758,094, filed Apr. 22, 2020, now U.S. Pat. No. 11,145,994, which is a 371 National Stage Application of PCT/US2018/057453, filed Oct. 25, 2018, expired, which claims the benefit of U.S. Provisional Patent Application Ser. No. 62/577,407, filed Oct. 26, 2017, expired, which applications are hereby incorporated by this reference in their entireties for all purposes as if fully set forth herein.

BACKGROUND OF THE INVENTION

Field of the Invention

The present invention relates to antennas for wireless communications, and more particularly, to multiband antennas that have low band and high band dipoles located in close proximity.

Related Art

There is considerable demand for cellular antennas that can operate in multiple bands and at multiple orthogonal polarization states to make the most use of antenna diversity. A solution to this is to have an antenna that operates in two orthogonal polarization states in the low band (LB) (e.g., 698-960 MHz) and in two orthogonal polarization states in the high band (HB) (e.g., 1.695-2.7 GHZ). A typical set of orthogonal polarization states includes +/−45 deg. There is further demand for the antenna to have minimal wind loading, which means that it must be as narrow as possible to present a minimal cross sectional area to oncoming wind. Another demand is for an antenna to have a fast rolloff gain pattern in both the High Band (HB) and Low Band (LB) to mitigate inter-sector interference. Conventional antennas have gain patterns with considerable side and rear lobes. These antennas are typically mounted on a single cell tower, each covering a different sector, which results in the side and rear lobes of their respective gain patterns overlapping, causing interference in the overlapping gain regions. Therefore it is desirable for an antenna to have a fast-rolloff gain pattern, whereby beyond a given angle (e.g., 45° or 60°), the antenna gain pattern falls off rapidly, thereby minimizing overlapping gain patterns between multiple sector antennas mounted on a single cell tower. Further, interference between the LB and HB dipoles can contaminate their respective gain patterns, thus degrading the performance of the antenna.

The need for both a compact array face and a fast rolloff gain pattern causes a conflict in objectives because the best way to achieve a fast rolloff gain pattern is to broaden the array face of the antenna, and broadening the antenna array face increases wind loading. Conversely, the more closely LB and HB dipoles are spaced together on a single array face, the more they suffer from interference whereby transmission in either the HB or the LB is respectively picked up by the LB and HB dipoles, causing coupling and re-radiation that contaminates the gain pattern of the transmitting band.

This problem can be solved with dipoles that are designed to be "cloaked", whereby they radiate and receive in the band for which they are designed yet are transparent to the other band that is radiated by the other dipoles sharing the same compact array face.

Cloaked dipoles are typically divided into conductive segments that are coupled by intervening inductor and/or capacitor structures. The conductive segments have a length that is less than one half wavelength of the RF energy (cloaked wavelength) for which induced current is to be prevented. The inductor and/or capacitor structures are tuned so that they resonate at and above this cloaked wavelength, being substantially open circuited above the cloaked wavelength and substantially short circuited below the cloaked wavelength.

LB dipoles are typically cloaked to prevent HB induced current from occurring in the LB dipole conductors. Otherwise, HB energy emitted by the HB dipole would induce a current in the LB dipole, which would subsequently re-radiate and interfere with the HB gain pattern.

As mentioned above, cloaked dipole structures involve inductors and/or capacitors located between conductive elements within the dipole arm. These structures may be complex and require additional PCB and metal layers, adhesives, and ancillary components that must be attached to or integrated into the dipole structure. As such, cloaked dipoles can be complicated, expensive and time consuming to manufacture, and may incur reliability issues.

Accordingly, there is a need for a multiband antenna, with a minimal array face but with strong multiband performance (e.g., clean gain patters with minimal interference and fast rolloff), and that has LB dipoles that are simple and easy to manufacture.

SUMMARY OF THE INVENTION

Accordingly, the present invention is directed to a low cost high performance multiband cellular antenna with cloaked monolithic metal dipole that obviates one or more of the problems due to limitations and disadvantages of the related art.

In an aspect of the present invention, a multiband antenna comprises a reflector plate, a plurality of high band dipoles configured to radiate RF energy in a high band, and a plurality of low band dipoles configured to radiate RF energy in a low band. Each of the low band dipoles has a plurality of low band dipole arms, each low band dipole arm being formed of a single piece of metal the single piece of metal having a plurality of inductor structures. The inductor structures each having a dimension that makes the inductor structure resonate at frequencies corresponding to the high band, hindering the low band dipole from re-radiating RF energy in the high band, and that enables the inductor structure to radiate RF energy in the low band.

In another aspect of the present invention, a multiband antenna comprises a reflector plate, a plurality of high band configured to radiate RF energy in a high band, and a plurality of low band dipoles configured to radiate RF energy in a low band. Each of the low band dipoles has a plurality of low band dipole arms, each low band dipole arm being formed of a single piece of metal and having a plurality of inductor structures in the low band dipole arm, wherein the inductor structures hinder induced current corresponding to RF energy radiated by at least one of the plurality of high band dipoles.

Further embodiments, features, and advantages of low cost high performance multiband cellular antenna with cloaked monolithic metal dipole, as well as the structure and operation of the various embodiments of the low cost high performance multiband cellular antenna with cloaked monolithic metal dipole, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate embodiment(s) of the low cost high performance multiband cellular antenna with cloaked monolithic metal dipole described herein, and together with the description, serve to explain the principles of the invention.

DESCRIPTION OF EXEMPLARY EMBODIMENTS

Figure 1A:
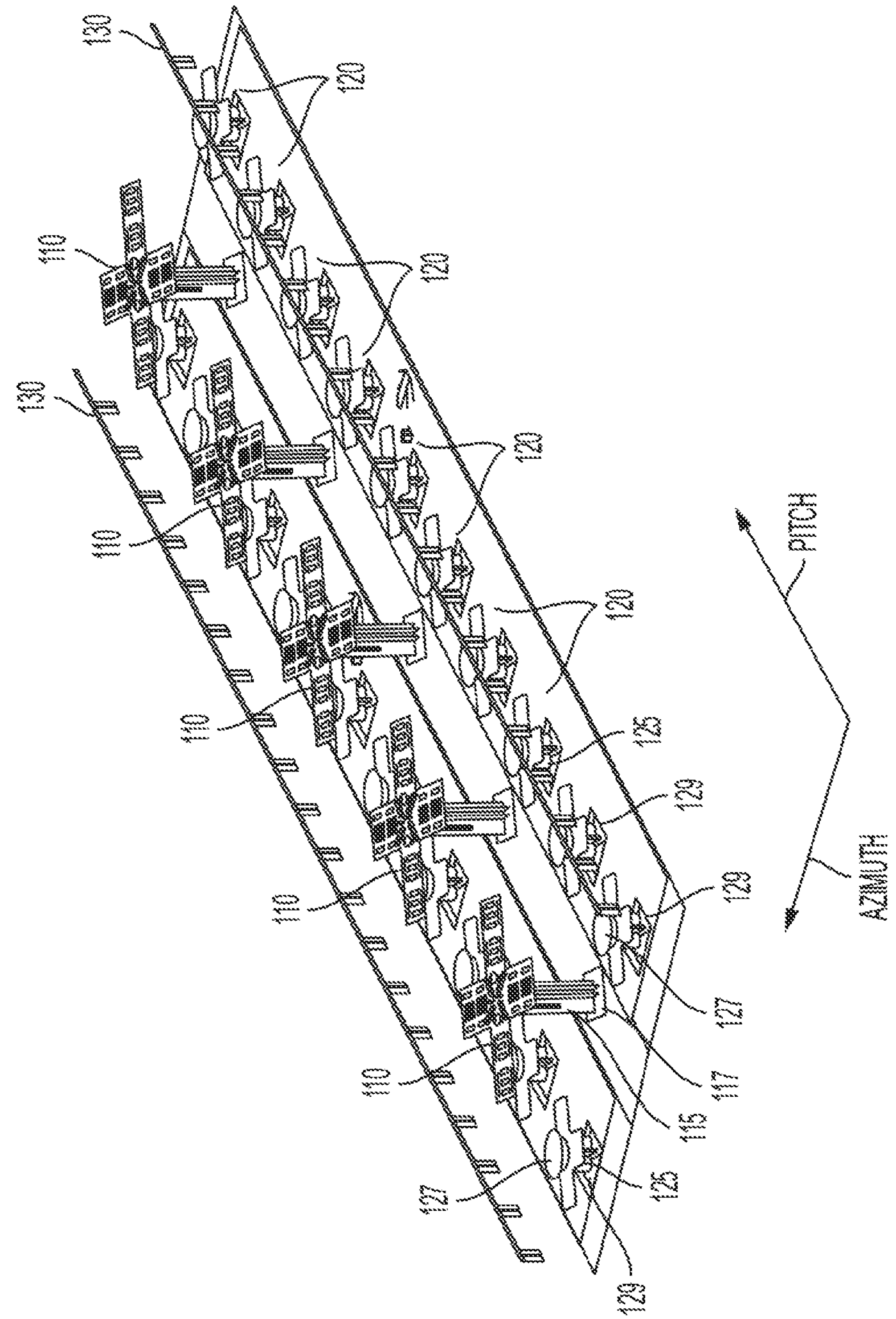
FIG. 1*a* illustrates an exemplary array face according to the disclosure.

Reference will now be made in detail to embodiments of the low cost high performance multiband cellular antenna with cloaked monolithic metal dipole with reference to the accompanying figures FIG. 1*a* illustrates an exemplary array face 100 according to the disclosure. Array face 100 includes a reflector plate 105: a plurality of low band (LB) dipoles 110 disposed on the reflector plate, each of the LB dipoles 110 having an LB dipole stem 115, which is mechanically and electrically coupled to a LB feedboard 117. Array face 100 also includes a "T-fence" low band parasitic element 130, which operates in conjunction with LB dipoles 110 in controlling the low band gain pattern of Array face 100.

Array face 100 further includes a plurality of high band (HB) dipoles 120. Each HB dipole 120 has an HB dipole stem 125 through which HB dipole 120 is mechanically and electrically coupled to an HB feedboard 129. HB dipole 120 further includes a passive HB radiator plate 127.

Further illustrated in FIG. 1*a* is a coordinate system having an azimuth axis and a pitch axis. The azimuth axis defines a plane (in conjunction with an array "z" axis that is perpendicular to the surface of the reflector plate 105) along which the azimuthal beamwidth is defined. Accordingly, different array face configurations (disclosed below) can create different gain patterns with an azimuthal beam dimension of different widths and rolloff characteristics. The exemplary array face 100, having a single column of LB dipoles 110, for example, would create a gain pattern with an approximately 67-68 degree azimuthal beamwidth with a nominal fast rolloff pattern. The other axis is the pitch axis, which defines a plane (again, in conjunction with an array "z" axis that is perpendicular to the surface of the reflector plate 105) along with the pitch angle of the gain pattern is defined. The antenna of array face 100 may have a set of phase shifters that provides a differential phase delay to the LB dipoles 110 or the HB dipoles 120, as a function of their respective position along the pitch axis. Depending on the differential phase delay, the gain pattern of array face 100 may be tilted up and down in the plane along the pitch axis.

Figure 1B:
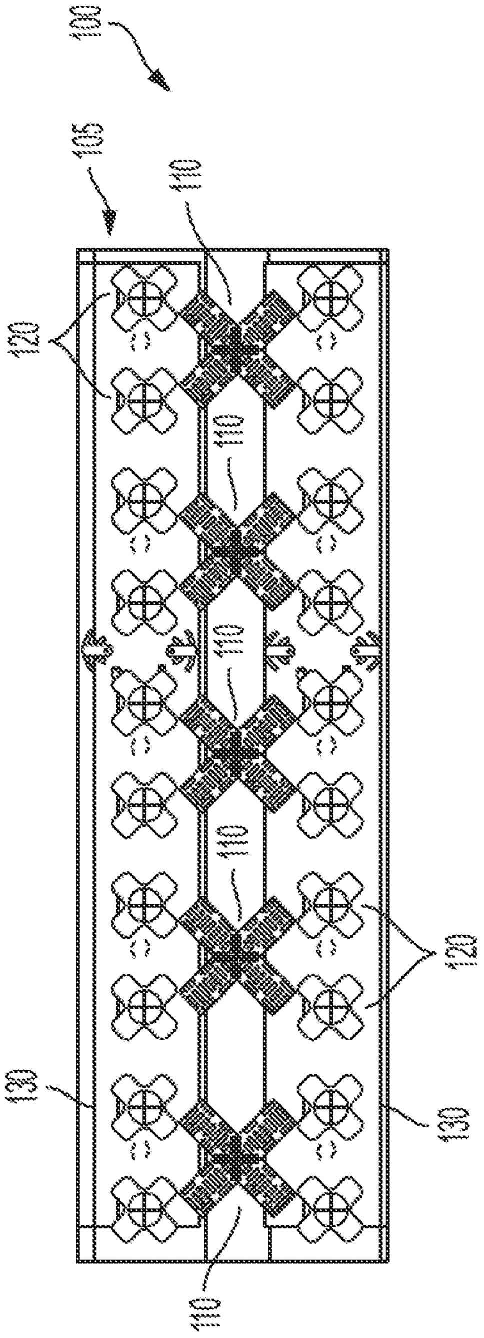
FIG. 1*b* is a "top down" view of the exemplary array face of FIG. 1*a*.

FIG. 1*b* is a "top down" view of exemplary array face 100, providing a clearer perspective on the relative position and spacing of LB dipoles 110 and HB dipoles 120. The dimensions of exemplary array face, which may be the same as those of reflector plate 105, may be 14.7" along the azimuth axis and 48" along the pitch axis. It will be understood that different dimensions are possible and within the scope of the invention, although if an array face is "wider" along the azimuth direction then the antenna may suffer from greater wind loading.

Figure 1C:
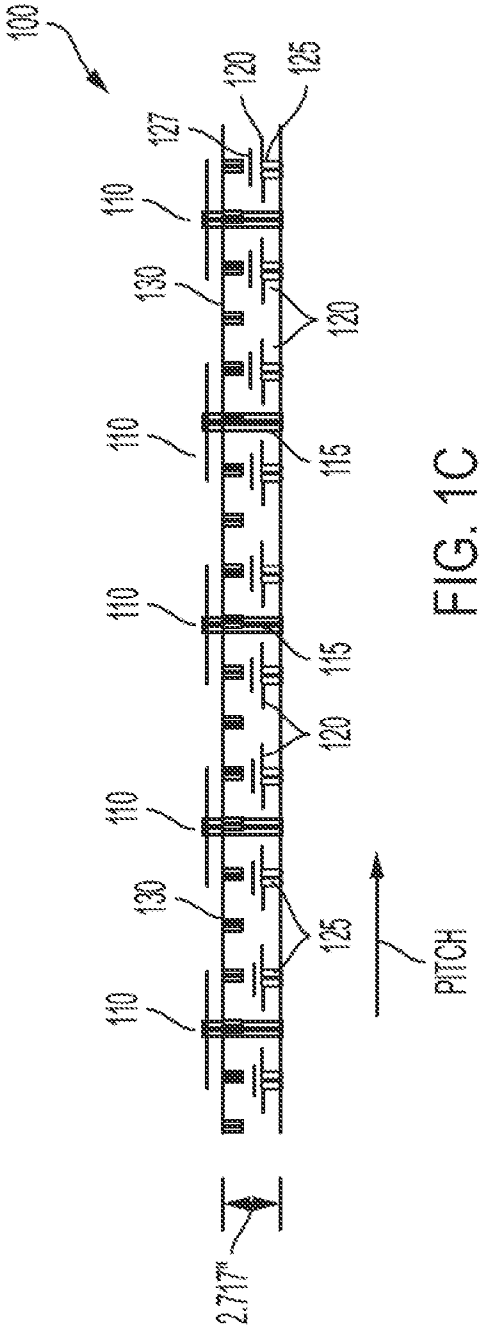
FIG. 1*c* is a side view of the exemplary array face of FIG. 1*a*, taken along the azimuth axis of the array face.

FIG. 1*c* is a side view of exemplary array face 100, taken along the azimuth axis of the array face 100, illustrating the relative heights of LB dipole 110, HB dipole 120, and T-fence 130.

Figure 1D:
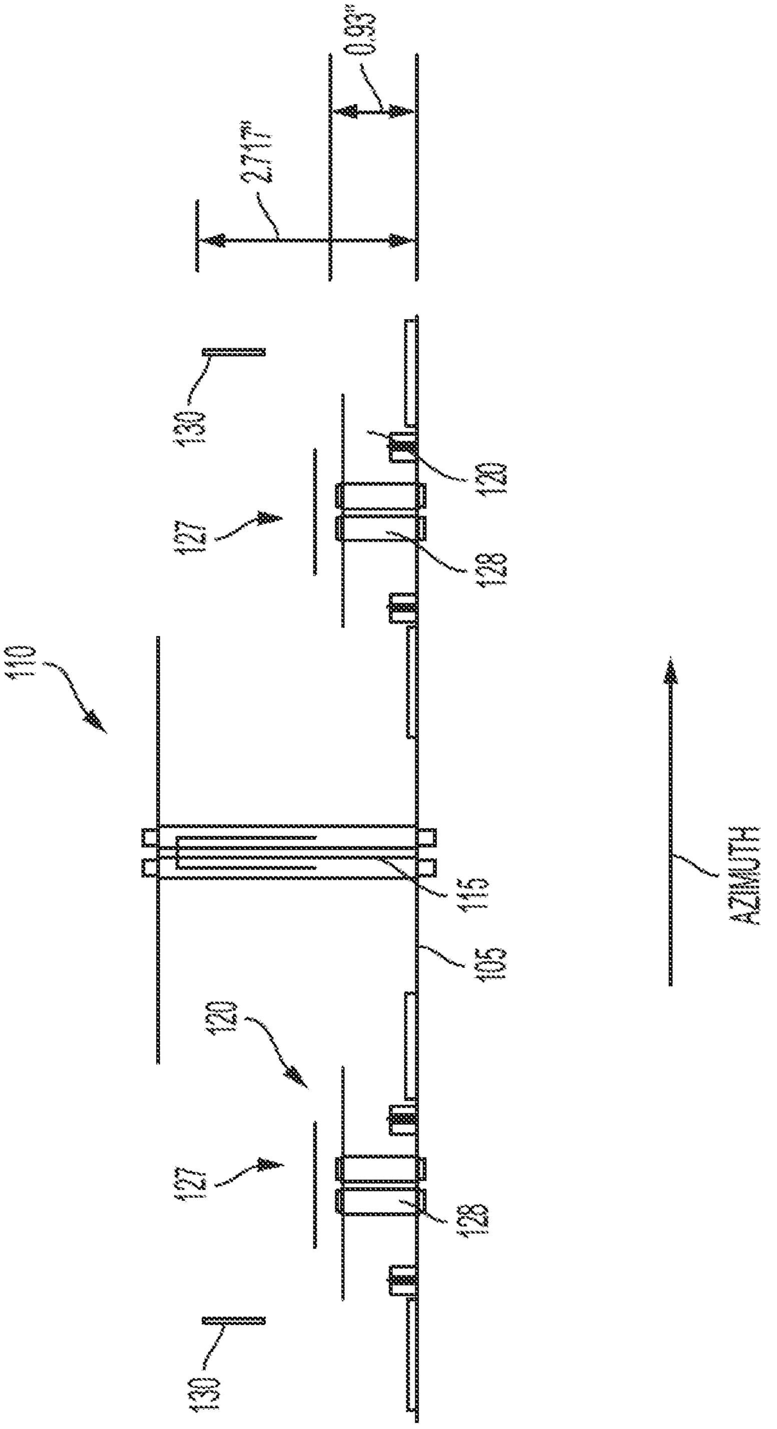
FIG. 1*d* is a side view of the exemplary array face of FIG. 1*a*, taken along the pitch axis of the antenna array face.

FIG. 1*d* illustrates array face 100 along the pitch axis, from either end of array face 100. As illustrated in FIG. 1*d*, LB dipole 110 and HB dipole 120 are respectively mechanically coupled to reflector plate 105 by LB dipole stem 115 and HB dipole stem 125, such that the LB dipoles 110 and HB dipoles 120 are at different elevations relative to reflector plate 105. Both LB dipole stem 115 and HB dipole stem 125 are oriented "vertically", i.e., orthogonal to the plane defined by the pitch and azimuth axes. For exemplary array face 100, LB dipole 110 may be elevated over reflector plate 105 at a height of about 3.3", and HB dipole 120 may be elevated above reflector plate 105 at a height of about 0.93". The significance of the HB dipole elevation is that it substantially prevents low band RF energy emitted by LB dipole 110 from inducing a current in the conductive surfaces disposed on HB dipole stem 125, which would otherwise re-radiate from HB dipole stem 125, subsequently corrupting the gain pattern of LB dipole 110. In particular, the LB dipole arms in a given polarization emits LB radiation that would otherwise induce a current in the conductive surfaces disposed on the HB dipole stem 125, which is subsequently re-radiated in a range of polarization states, including the orthogonal polarization state. This re-radiated orthogonal polarization component would in turn induce a current (and thus re-radiation) in the orthogonal polarization LB dipole arms, causing cross polarization interference, which can severely degrade the LB performance of the antenna.

There is a tradeoff. Generally, locating HB dipole 120 closer to reflector plate 105 reduces the bandwidth of HB dipole 120. However, there is a "sweet spot" at an elevation of 0.93" whereby the current LB induced is effectively mitigated and the bandwidth-limiting effects of proximity to reflector plate 105 are not yet prevalent. The elevation of HB dipole 120 may vary around 0.93" by as much as +/−⅛" without significantly degrading the performance of the HB dipole 120. Any lower elevation beyond this tolerance (closer to the reflector plate 105) results in diminished bandwidth. Any higher elevation beyond this tolerance incurs increased induced current from the LB dipole 110.

An advantage of this arrangement is that, at an elevation of approximately 0.93", HB dipole 120 need not have any cloaking structures (inductors and/or capacitors embedded among the dipole conductive elements), which would increase the complication and cost of HB dipole 120. This is because the majority of the LB induced current occurs in the HB dipole stem 125 and not in the radiators of HB dipole 120. Accordingly, mitigating induced current in HB dipole stem 125 effectively addresses the problem, and cloaking structures in the radiators of HB dipole 120 are unnecessary.

Further illustrated in FIG. 1*d* is the elevation of T-fence 130 above the reflector plate 105, which may be about 2.717". T-fence 130 is a passive parasitic radiator that engages with the RF gain pattern of LB dipole 110 to control the gain pattern in the azimuthal direction. T-fence 120 may be mechanically coupled to the mechanical supports for the antenna radome (not shown). T-fence 130 may be made of aluminum.

Figure 2:
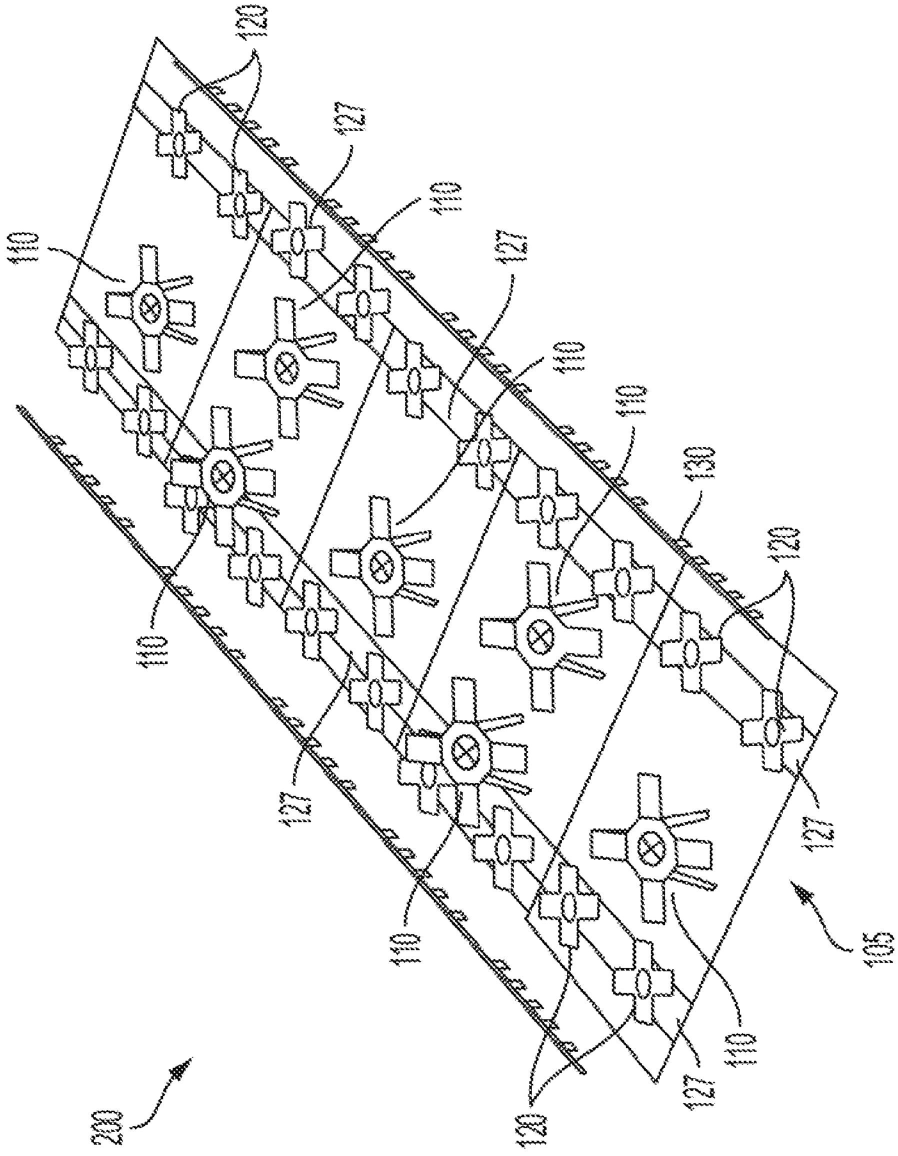
FIG. 2 illustrates an exemplary fast rolloff array face with an approximately 60 degree azimuthal beamwidth.

FIG. 2 illustrates an exemplary 60 degree fast rolloff array face 200 according to the disclosure. Array face 200 may be substantially similar to array face 100, with the following exceptions. As illustrated, LB dipoles 110 are spaced in a "1-2-1-2-1" configuration along the pitch axis such that, if one were to divide array face 200 into unit blocks, the unit blocks at each end would have one LB dipole, and the unit blocks adjacent to the end unit blocks have two LB dipoles 110 located next to each other along the azimuth axis. Further, to accommodate the side-by-side arrangement of LB dipoles 110, HB dipole feedboards 129 (along with their corresponding HB dipoles 120) are spaced further apart along the azimuth axis of array face 200. This configuration of fast rolloff array face 200 results in a well defined 60 degree azimuthal beamwidth with reduced side and rear lobes (and thus provide fast rolloff), which might otherwise cause interference between adjacent cellular sectors on the same cell tower.

Variations to fast rolloff array face 200 are possible and within the scope of the disclosure. For example, instead of the illustrated 1-2-1-2-1 LB dipole configuration, the LB dipoles 110 may be arranged in a 2-1-2-1-2 configuration. This configuration would have a similar gain pattern and performance to the 1-2-1-2-1 configuration, but would incur additional cost because it has an additional LB dipole 110. In a further variation, each unit block may be identical and have the two LB dipoles adjacent along the azimuth axis, in a 2-2-2-2-2 arrangement. This antenna array face would have a tighter azimuthal gain pattern due to the enhanced array factor, with an approximate 45-50 degree azimuthal beamwidth. Further, the antenna array face may have more than five unit blocks, as would be the case with a 6' or 8' antenna. It will be readily apparent that such variations are possible and within the scope of the disclosure.

Figure 3A:
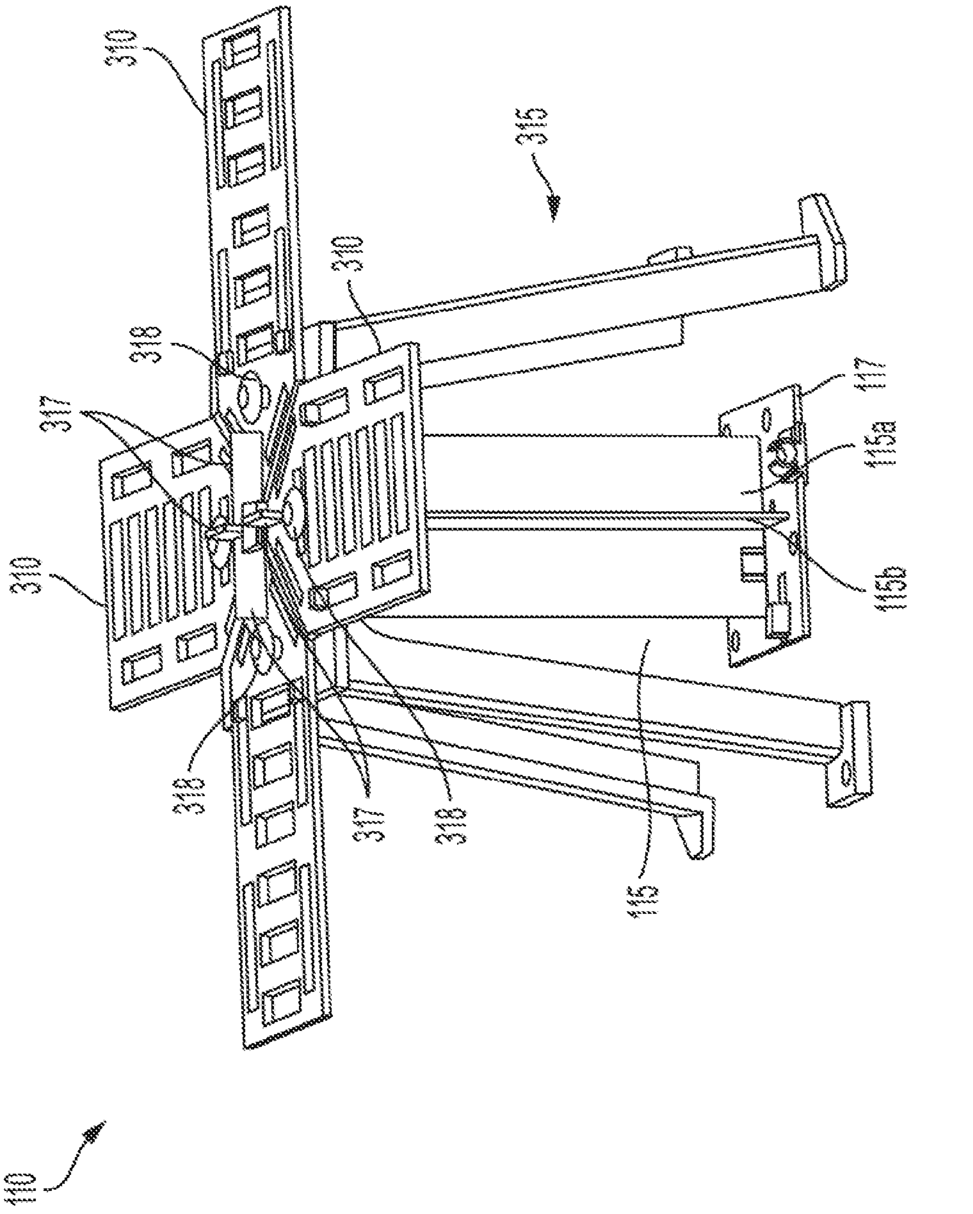
FIG. 3*a* illustrates an exemplary low band high performance dipole according to the disclosure.

FIG. 3*a* illustrates an exemplary LB dipole 110 according to the disclosure. Illustrated in FIG. 3*a* are four LB dipole arms 310 that are disposed on a support pedestal 315. Each LB dipole arm 310 is electrically coupled to its corresponding balun circuit disposed on either first LB dipole stem plate 115*a* or second LB dipole stem plate 115*b* (both of which make up LB dipole stem 115) at a solder point on PCB mounting tab 317. Each LB dipole arm 310 is also mechanically coupled to dipole stem 115 by the same solder point on PCB mounting tab 317. Each LB dipole arm 310 is further mechanically coupled to support pedestal 315 via a respective pedestal fastener 318. The four pedestal fasteners 318 may be integrated into support pedestal 315 or may be implemented as rivets. It will be understood that other forms of fastener for pedestal fastener 318 are possible and within the scope of the disclosure.

Figure 3B:
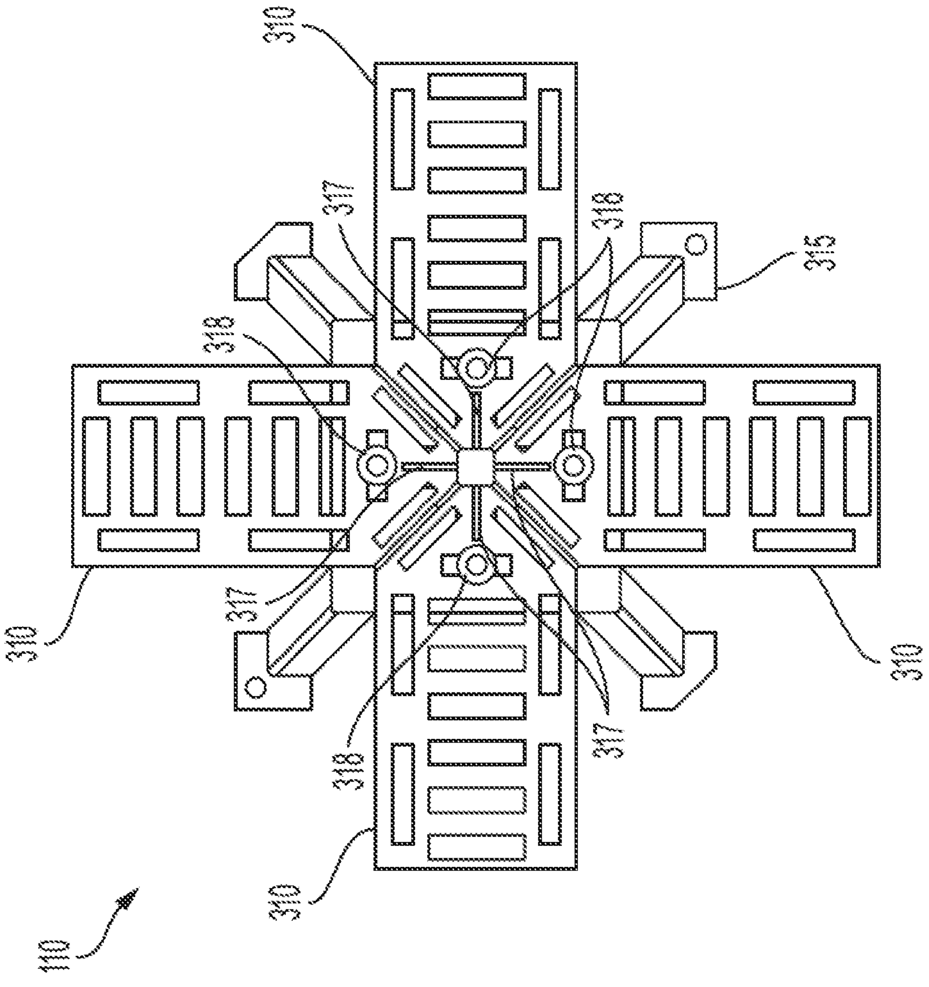
FIG. 3*b* is a "top down" view of the low band dipole of FIG. 3*a*.

FIG. 3*b* is a "top down" view of low band dipole 110. Illustrated are the four dipole arms 310, a visible portion of support pedestal 315, pedestal fasteners 318, and PCB mounting tabs 317 (viewed edge-on). Also shown are certain dimensions of the combined LB dipole arms 310 in the +/−45 degree polarizations emitted by LB dipole 110.

Figure 3C:
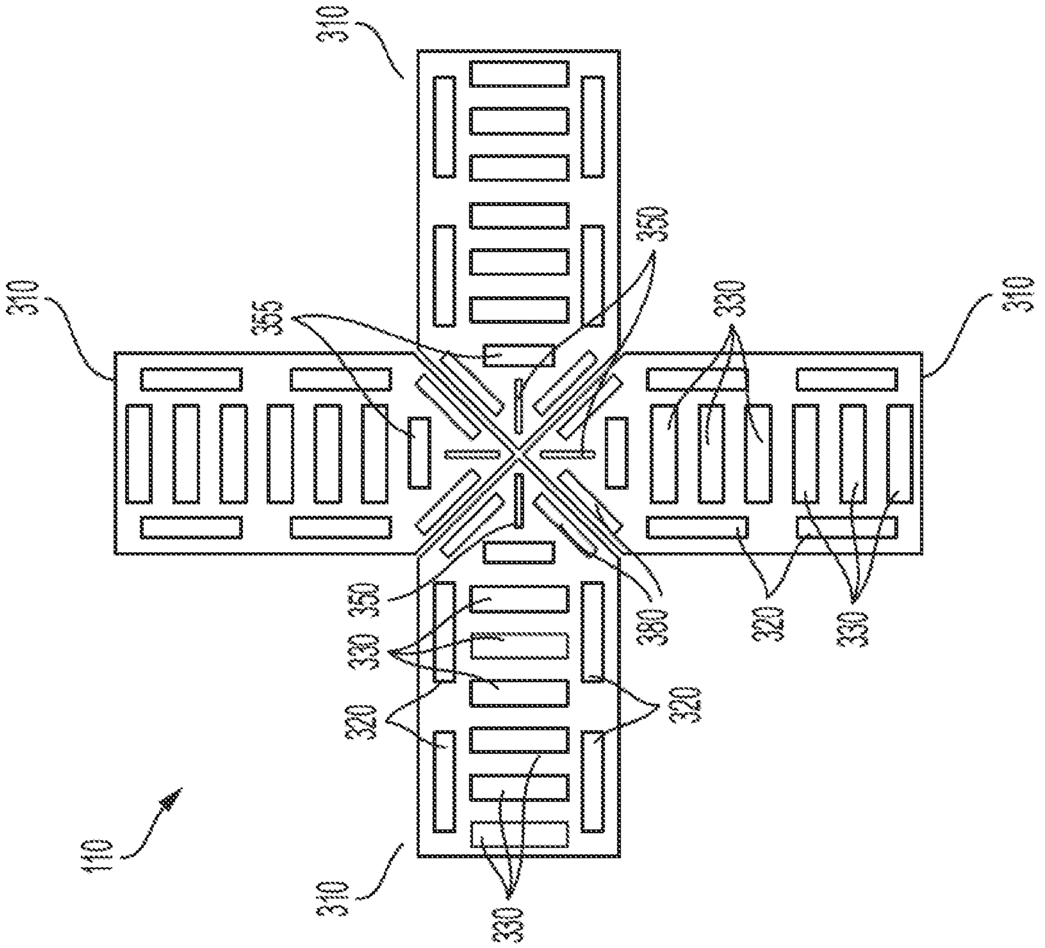
FIG. 3*c* is a "top down" view of the low band dipole arms of the low band dipole of FIGS. 3*a* and 3*b*.

FIG. 3*c* is a "top down" view of the four LB dipole arms 310, illustrated as they would be arranged in LB dipole 110 in FIG. 3*b*. As illustrated, each LB dipole arm 310 has a plurality of on-axis slots 320 and orthogonal slots 330, a pair of diagonal slots 340, a fastener insertion slot 355, and a balun connection point 350. Each LB dipole arm 310 may be formed of a single piece of metal, such as aluminum, which may have a thickness of around 0.063". A precise gap distance is provided between adjacent LB dipole arms. In the example here, the gap is maintained at 0.056". Each LB dipole arm 310 may be identical and formed by stamping the illustrated pattern out of a sheet of aluminum. Other conductive materials, such as brass and sheet metal are also possible.

Each of the on-axis slots 320 and orthogonal slots 330 are openings in the structure of LB dipole 310, forming a plurality of inductor structures in the remaining metal surrounding the slots. Each inductor structure functions as an open circuit at HB frequencies (e.g., 1.695-2.7 GHZ) and functions as a short circuit at LB frequencies (e.g., 698-960 MHz). Given the orientations of on-axis slots 320 and orthogonal slots 330, HB RF energy emitted by HB dipole 120 in the +45 degree polarization does not induce a current in LB dipole arms 310 because the correspondingly oriented slots function as inductors that render LB dipole 110 transparent to the +45 degree polarized RF energy. The same is true for the other emitted polarization state, whereby HB RF energy emitted by HB dipole 120 in the −45 degree polarization also does not induce a current in LB dipole arms 310 due to the other slots (orthogonal to the slots corresponding to the +45 degree polarization orientation) in LB dipole arms 310, rendering LB dipole 110 transparent to the −45 degree polarized RF energy.

FIG. 3*c* further provides dimensions: 6.378" for the length of LB dipole 110, and 1.575" for the width of each LB dipole arm 310. This aspect ratio provides for proper bandwidth while constraining the length of each LB dipole arm 310. If LB dipole arms 310 get longer, they may physically interfere with, or shadow, the nearby HB dipoles 120 on the array face 100/200. Conversely, if LB dipoles 310 are wider, their respective polarization isolation degrades, and each +45 degree oriented LB dipole arm 310 may have a radiation component in the −45 degree orientation, for example.

Figure 3D:
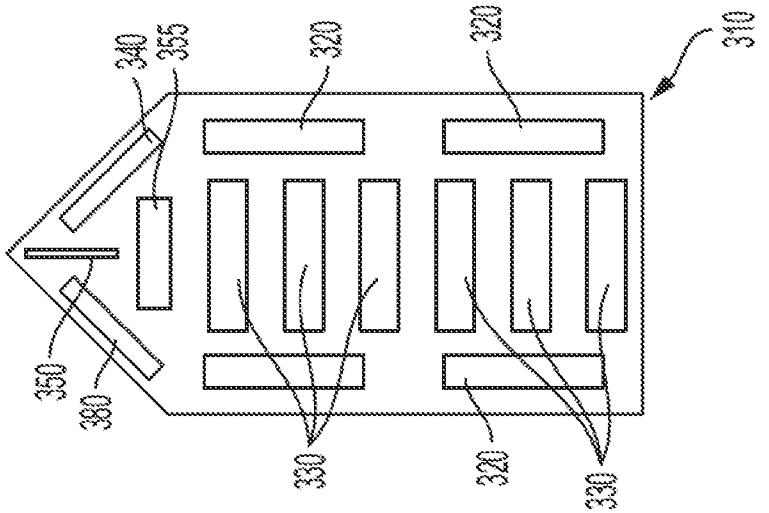
FIG. 3*d* illustrates one of the low band dipole arms of FIG. 3*c*, providing further detail and dimensions.
Figure 3E:
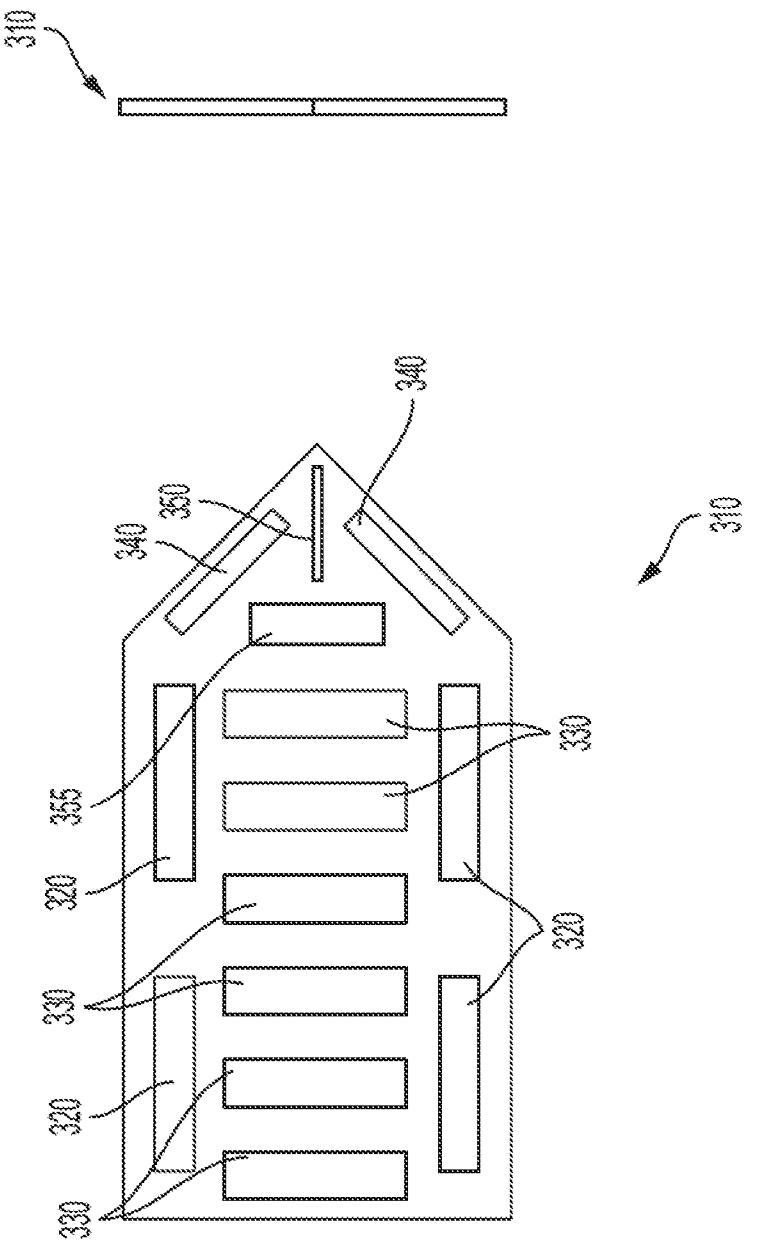
FIG. 3*e* is another view of one of the low band dipole arms, providing further detail and dimensions.

FIGS. 3*d* and 3*e* provide further detail of exemplary dipole arm 310. FIG. 3*d* illustrates one of the low band dipole arms 310 of FIG. 3*c*. The overall length of the low band dipole arm is 3.150". The length of an on-axis slot 320 is 0.787" and the width of an on-axis slot 320 is 0.157". The length of an orthogonal slot 330 is 0.748" and the width of an orthogonal slot 330 is 0.197". The length of a diagonal slot 340 is 0.630 and the width of a diagonal slot is 0.098".

FIG. 3*e* is another view of one of the low band dipole arms 310. As illustrated, a fastener insertion slot 355 has a length of 0.164" and a balun connection point 350 has a length of 0.430" and an edge space 0.120" from a vertex of the low band dipole arm 310. Diagonal edges of the low band dipole have are at an angle from the long edge of the low band dipole arm of 45°. A depth dimension of the low band dipole arm 310 is 0.063".

Figure 4:
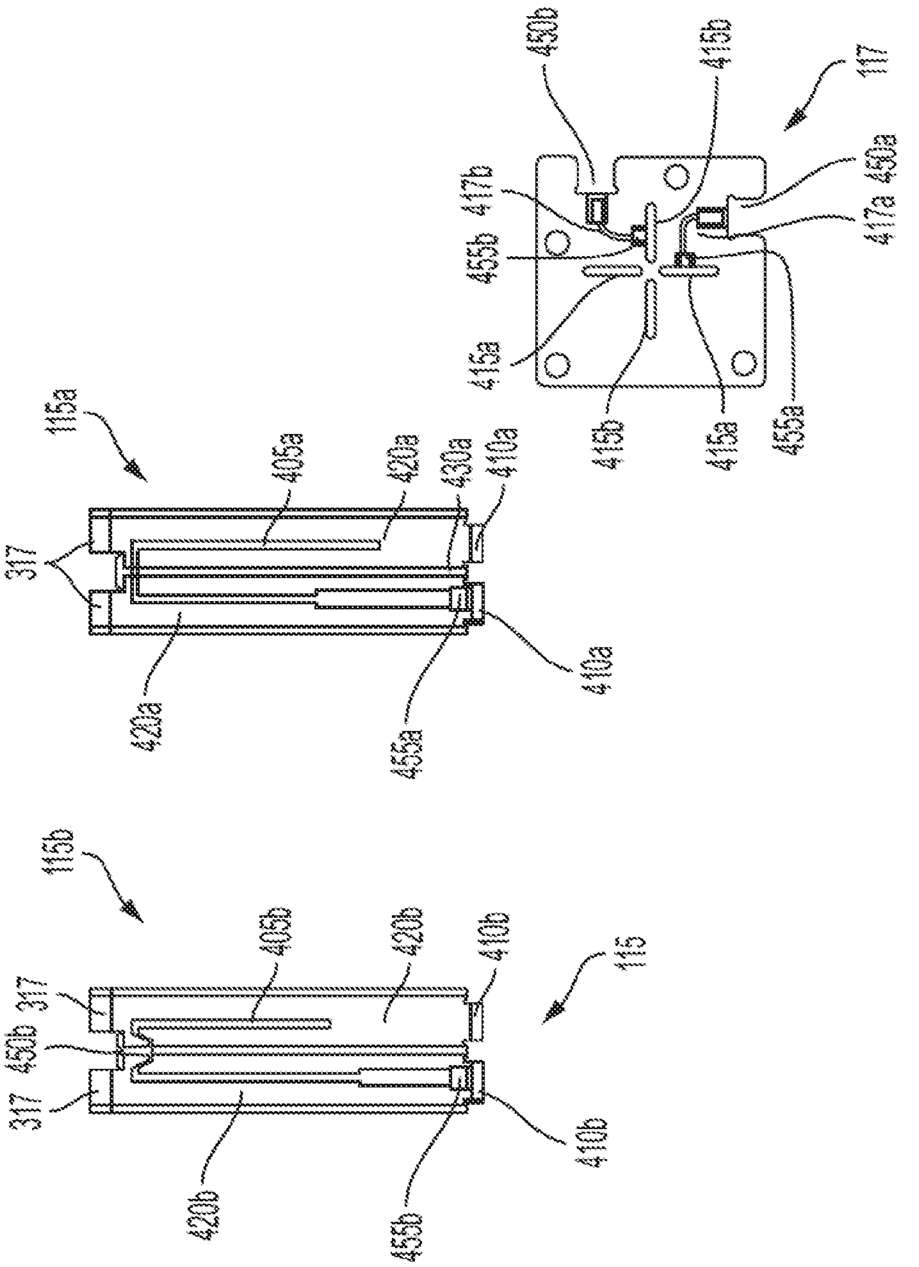
FIG. 4 illustrates two exemplary dipole stem plates that form the dipole stem of the exemplary low band dipole as well as an exemplary low band feedboard.

FIG. 4 illustrates exemplary LB dipole stem plates 115*a* and 115*b* that form dipole stem 115. Also illustrated is an exemplary LB feedboard 117, which has a length of 1.60" and a width of 1.60". LB dipole stem plates 115*a* and 115*b* respectively have disposed on them balun circuitry 405*a* and 405*b*, each of which provides the RF signal to the respective pair of LB dipole arms 310 corresponding to either the +45 degree polarized RF signal or the −45 degree polarized RF signal. LB dipole stem plate 115*a* shall be described as an example for both it and LB dipole stem plate 115*b*, for which the description is similar. LB dipole stem plate 115*a* is illustrated as being transparent for the purposes of illustrating the circuitry on both of its sides. On one side is disposed balun circuitry 405*a*, and on the other side are disposed ground plates 420*a*. LB dipole stem plate 115*a* includes PCB mounting tabs 317 (described earlier), and base tabs 410*a*. Base tabs 410*a* insert into slots 415*a* formed in LB feedboard 117. The base of the LB dipole stem plate 115 is 1.15". The height of the LP dipole stem plate is 3.63". Ground plate 420*a* is disposed on LB dipole stem plate 115*a* such that it continues to the lower edge of base tab 410*a*, where it is electrically coupled to the ground plane (not shown) of LB feedboard 117 via a solder joint. On the balun circuitry side of LB dipole stem plate 115*a* is solder point 455*a*, which is disposed on and thus coupled to balun circuitry 405*a*. Solder point 455*a* is coupled, by RF jumper 417*a*, to RF cable solder point 450*a*, which is disposed within a notch formed in LB feedboard 117. Further, ground plate 420 is disposed on LB dipole stem plate 115*a* such that it also extends to PCB mounting tab 317, where it is electrically coupled to the two corresponding LB dipole arms 310 corresponding to a given polarization state. It is through this set of connections that the RF signal for one of the +/−45 degree polarization is coupled from the RF cable solder point 450*a* on LB feedboard 117 to the two LB dipole arms 310 coupled to LB stem plate 115*a*. It will be apparent that the same description applies to LB dipole stem plate 115*b* and its corresponding components on LB feedboard 117, except that it will apply to the other, orthogonal, polarization state for LB dipole 110.

Figure 5B:
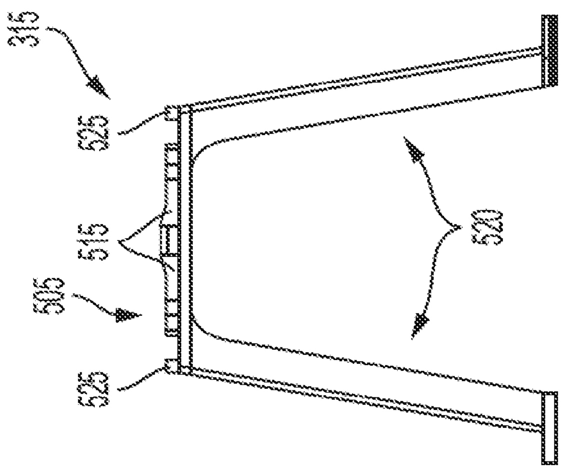
FIG. 5*b* is a side view of the dipole support pedestal of FIG. 5*a*.
Figure 5A:
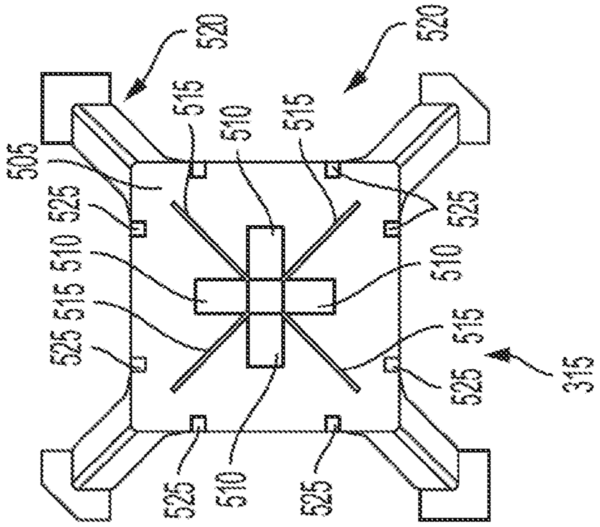
FIG. 5*a* is a "top down" view of a dipole support pedestal of the exemplary low band dipole of FIG. 3*a*.

FIG. 5*a* is a top-down view of support pedestal 315, and FIG. 5*b* is a side view of support pedestal 315. As illustrated, support pedestal 315 has four legs 520 and a top surface that has four rectangular openings 510 through which PCB mounting tabs 317 are disposed for coupling to LB dipole arms 310. The distance between outermost edges of each of the four legs is 3.53". Also disposed on the top surface of support pedestal 315 are four alignment ridges 515, which lie between LB dipole arms 310. The alignment ridges 515 not only provide for stability in mounting the LB dipole arms 310, they also maintain a precise gap distance between adjacent LB dipole arms. In the example here, the gap is maintained at 0.056". Also disposed on the top surface of support pedestal 315 are eight alignment pins 525 that are located such that they mechanically engage the inner walls of an innermost orthogonal slot 330 of the corresponding LB dipole arm. FIG. 3*a* illustrates how alignment ridges 515 and alignment pins 525 mechanically engage LB dipole arms 310 to maintain alignment and stability on support pedestal 315.

Figure 6:
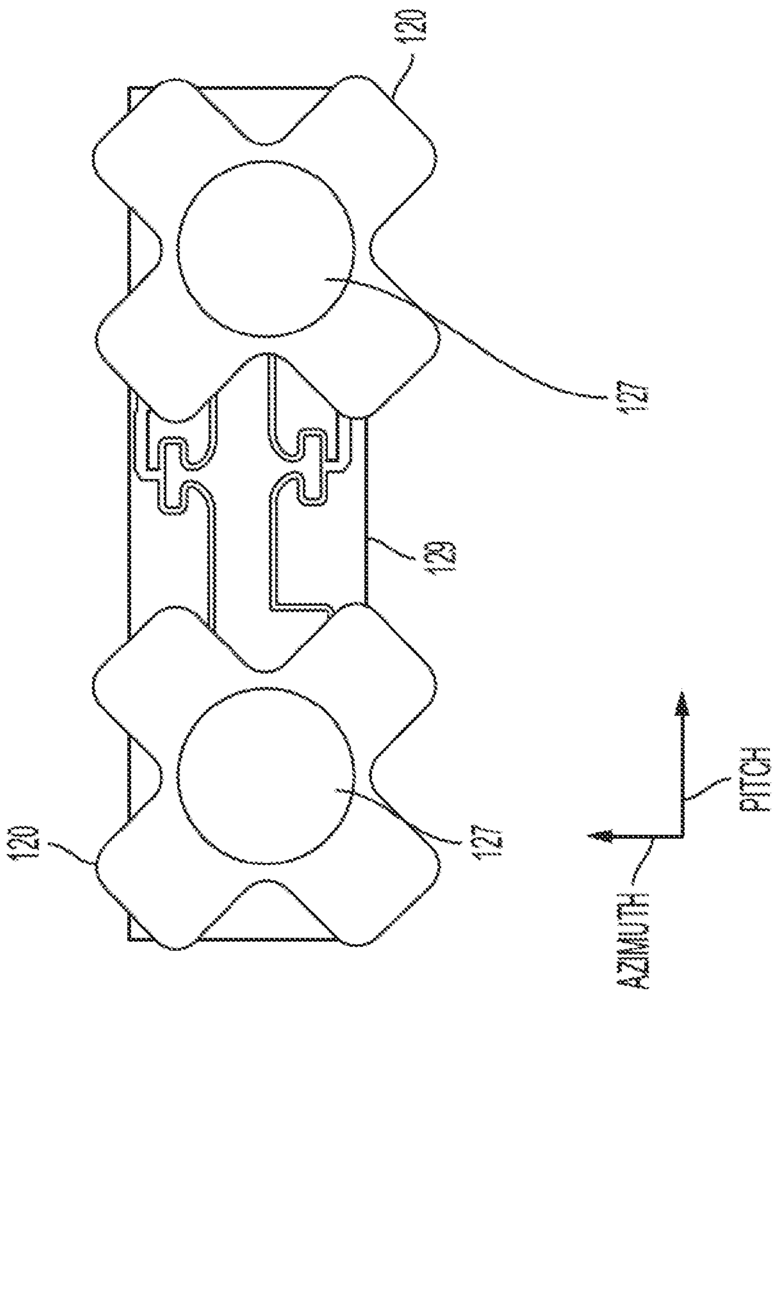
FIG. 6 is a "top down" view of two exemplary high band dipoles and their corresponding feedboard.

FIG. 6 is a "top down" view of two exemplary high band dipoles 120 and their corresponding feedboard 129, including passive HB radiator plate 127. An example dimension for the HB dipole 120 itself is 3.540" from opposite edges of the dipole arms. The passive HB radiator plate has a diameter of 1.600". FIG. 6 provides exemplary mutual spacing of the HB dipole components.

Figure 7:
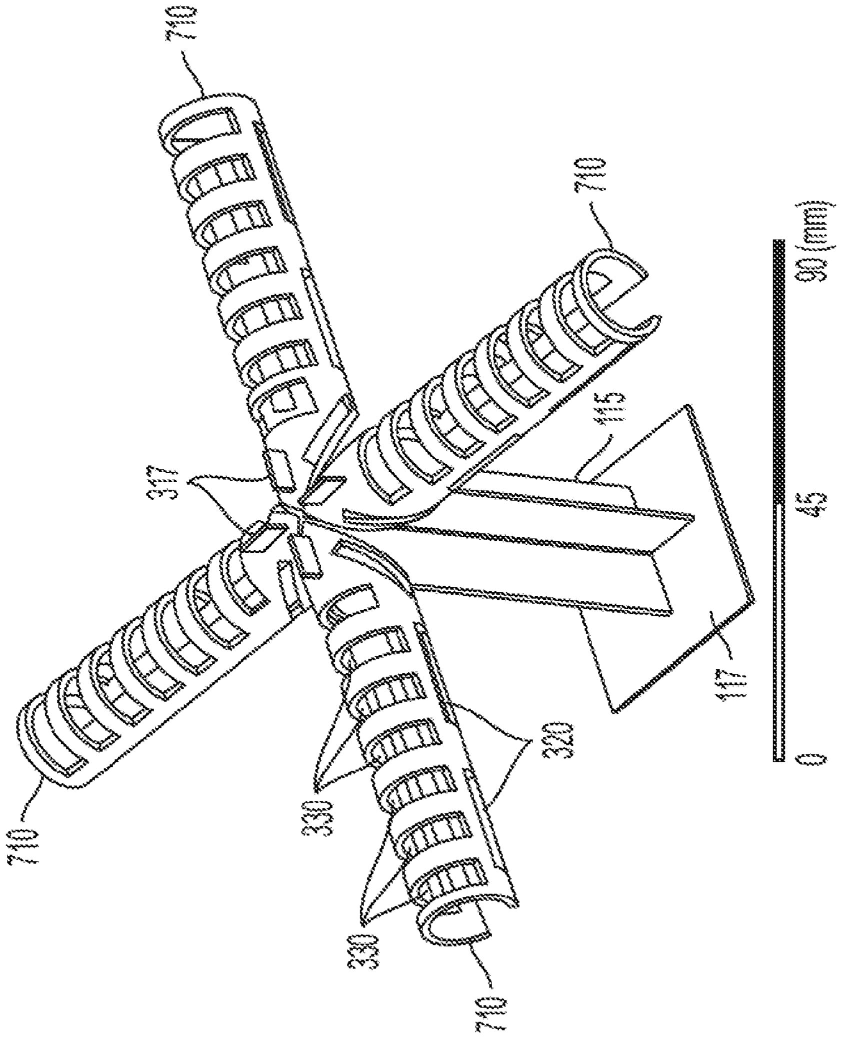
FIG. 7 illustrates a further embodiment of a low band dipole according to the disclosure.

FIG. 7 illustrates a tubular low band dipole 700 according to the disclosure. Tubular LB dipole 700 has four tubular LB dipole arms 710, which may be similar or identical to LB dipole arms 310 that have been bent into a substantially tubular shape. An advantage of tubular LB dipole 700 is that it has the same bandwidth performance of LB dipole 110, with the additional improvement in that the curvature of the tube shape greatly reduces interference with the HB dipole 120 by scattering the HB RF energy and substantially not re-radiating it back to the HB dipole 120. This occurs because any induced HB current disperses in conjunction with the curvature of the tubular shape. This leads to an improved HB gain pattern due to greatly reduced shadowing and coupling between the HB dipole 120 and the LB dipole 110.

In an exemplary embodiment, the diameter of the roll of tubular LB dipole arm 710 may be substantially 0.5", with a 3/32" gap between the longitudinal outer edges of the dipole arm. Variations to the tubular LB dipole 700 are possible and within the scope of the disclosure. For example, one variation of LB tubular dipole 700 may involve a broader diameter curvature of the tube shape, and thus with a wider gap between the longitudinal edges of LB tubular dipole arms 710. However, the lessening the curvature of the tubular structure diminishes the benefits of scattering incurred by the curved shape, thus diminishing the inhibited interference for the HB dipole 120. Reducing the diameter of curvature yields improved performance, but it then becomes more of a challenge to maintain a consistent gap between the longitudinal edges of the dipole arms. Another variation within the scope of the disclosure is to have tubular LB dipole arms 710 formed as tubes with no gap. This may improve performance. However, to manufacture this variation of tubular LB dipole arms 710, instead of stamping and bending a single piece of sheet aluminum (for example), one could start with an aluminum tube and mill out the slots described above. This variation to tubular LB dipole 710 would likely increase the cost of manufacturing.

The embodiment illustrated in FIG. 7 may have a balun structure, dipole stem structure, and support pedestal structure substantially similar to that disclosed above for LB dipole 110. It will be apparent to one skilled in the art how to apply the above teaching regarding the mechanical support of LB dipole 110 to tubular LB dipole 700.

Figure 8:
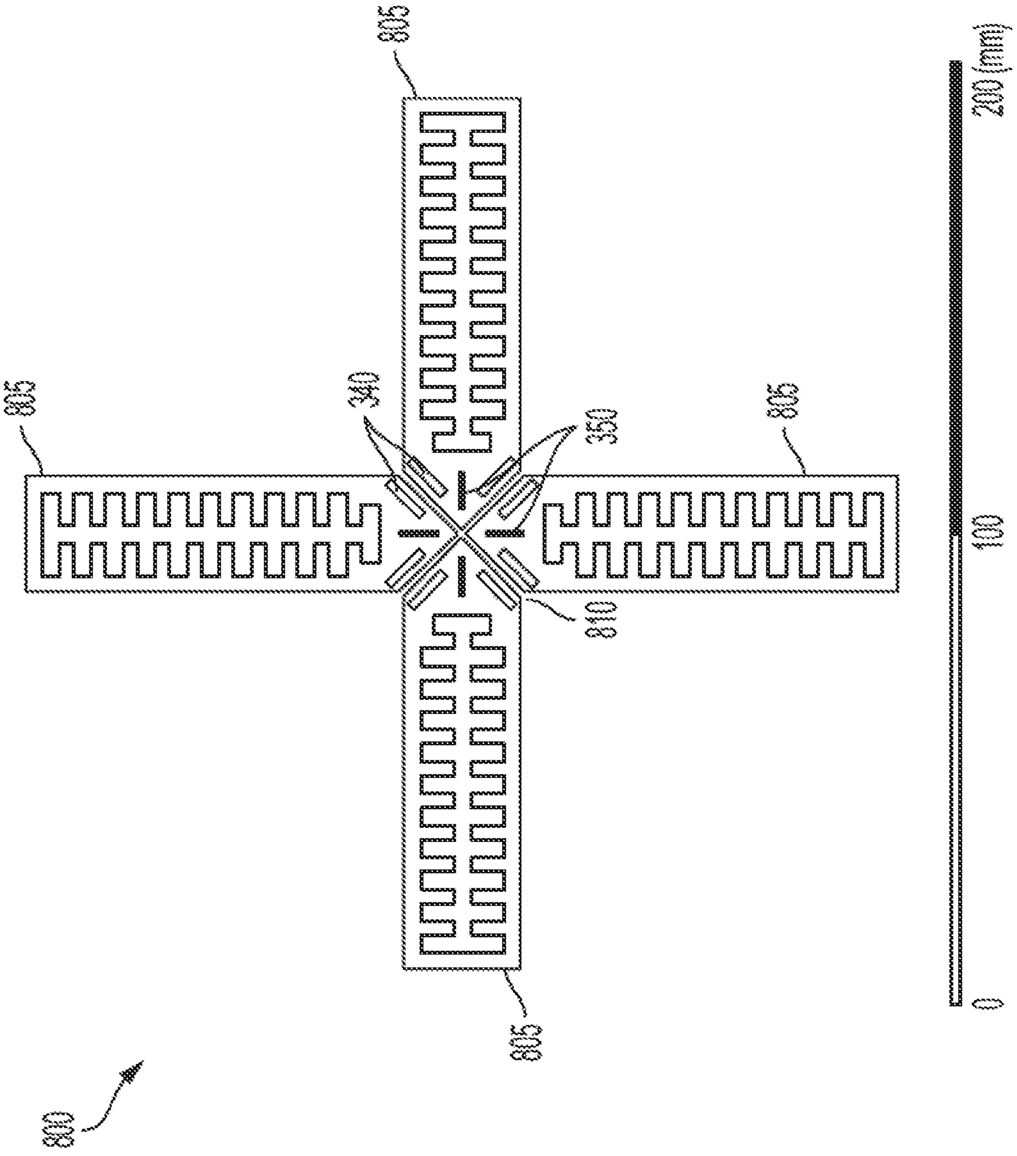
FIG. 8 illustrates another embodiment of a low band dipole according to the disclosure.

FIG. 8 illustrates an exemplary LB dipole 800 that has a "sawtooth" structure. LB dipole 800, like the other disclosed LB dipoles, has four dipole arms 805 arranged in a cross pattern, with a gap 810 between them. The dipole arms 805 may be mounted to an above-disclosed pedestal 315 using a pair of diagonal slots 340 as described above. Further, each dipole arm 805 may be electrically coupled to its respective stem and balun circuitry via balun connection point 350. A scale is provided in FIG. 8 to provide example dimensions. In the case of LB dipole 800, the slots within each dipole arm take the form of a sawtooth pattern. LB dipole 800 may be formed of aluminum, brass, sheet metal, or other conductive materials with similar conductive properties and rigidity.

As illustrated, it will be apparent that the dipole arms 805 of LB dipole 800 are longer and narrower than those of the other LB dipoles disclosed above. Having the dipole arms 805 longer improves its LB performance, and having the dipole arms 805 narrower reduces interference with the HB dipoles that are in the vicinity of the array face. The sawtooth structure of LB dipole arms 805 provide improved cloaking over the other embodiments, due to the fact that the structure reduces the pathways by which HB transmissions might excite the metal in the LB dipole. Having a narrower dipole arm 805 generally reduces the LB bandwidth, relative to a wider dipole arm. This may be compensated for by raising the LB dipole 800 to a height of approximately 85 mm, and by tuning the balun circuit on the dipole stem. It will be understood that the act of tuning a balun circuit is known to the art and need not be described in further detail.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Thus, the breadth and scope of the present invention should not be limited by any of the above-described exemplary embodiments but should be defined only in accordance with the following claims and their equivalents.

What is claimed is:

1. A dipole, comprising:

four identical dipole arms arranged in a cross pattern, whereby each of the four identical dipole arms is formed of a single piece of metal, whereby the four identical dipole arms have a first dipole arm pair arranged opposite each other, and a second dipole arm pair arranged opposite each other, whereby the first dipole arm pair are configured to radiate a first RF (Radio Frequency) signal and the second dipole arm pair are configured to radiate a second RF signal;

a first balun stem plate that is mechanically and electrically coupled to the first dipole arm pair; and a second balun stem plate that is mechanically and electrically coupled to the second dipole arm pair, wherein the first balun stem plate and the second balun stem plate are mechanically coupled in a cross pattern, and wherein each of the four identical dipole arms comprise a plurality of slot-shaped holes, and wherein the plurality of slot-shaped holes comprises on-axis slots and orthogonal slots.

2. The dipole of claim 1, wherein each dipole arm comprises a balun connection point.

3. The dipole of claim 2, wherein the balun connection point comprises a slot in the dipole arm.

4. The dipole of claim 1, further comprising a pedestal having four pedestal fasteners.

5. The dipole of claim 4, wherein each of the four identical dipole arms comprises a fastener insertion slot mechanically coupled to a corresponding pedestal fastener.

6. The dipole of claim 1, wherein each of the four identical dipole arms comprises a plurality of inductor structures.

7. The dipole of claim 1, wherein each of the four identical dipole arms is stamped from a single piece of metal.

8. The dipole of claim 7, wherein the single piece of metal comprises one of aluminum, sheet metal, and brass.

* * * * *